United States Patent

Bennett

[11] 3,979,956
[45] Sept. 14, 1976

[54] LOW PRESSURE LOSS FLUID FLOW METER

[75] Inventor: Arthur Joseph Bennett, Billinghurst, England

[73] Assignee: Gervase Instruments, Limited, Cranleigh, England

[22] Filed: July 16, 1975

[21] Appl. No.: 596,376

[30] Foreign Application Priority Data

July 18, 1974 United Kingdom............ 31946/74

[52] U.S. Cl. ............................................. 73/228
[51] Int. Cl.² ........................................... G01F 1/28
[58] Field of Search................... 73/207, 228, 186

[56] References Cited
UNITED STATES PATENTS

| 696,999 | 4/1902 | Neale | 73/228 X |
| 1,025,809 | 5/1912 | Kieser | 73/207 |
| 2,775,890 | 1/1957 | Waldron | 73/228 X |
| 3,282,102 | 11/1966 | Rosaen | 73/228 |

*Primary Examiner*—Richard C. Queisser
*Assistant Examiner*—John P. Beauchamp
*Attorney, Agent, or Firm*—Wood, Herron & Evans

[57] ABSTRACT

A fluid flow meter comprising a flow tube of generally circular cross section in which is mounted a pair of generally semicircular vanes arranged for pivotal movement about a common diametral axis, said vanes being biased by resilient means into positions so as to close the tube and fluid flow indicating means for measuring gas flow rates in the range including flare gas flows and furnace combustion air flows.

5 Claims, 2 Drawing Figures

LOW PRESSURE LOSS FLUID FLOW METER

DISCUSSION OF PRIOR ART

The fluid flows usually encountered with gas flares or the supply of combustion air to furnaces are usually at low static pressures and therefore cannot easily be measured, since the pressure drop across the conventional fluid flow devices is small and the range of sensitivity is generally only of the order between 100 per cent and 25 per cent of full scale deflection.

It is a primary aim of this invention to broaden the sensitivity range of a gas fluid flow meter and it is a further aspect of the invention to reduce the permanent pressure loss which results from conventional differential pressure devices for fluid flow measurement.

Accordingly the invention provides a none type fluid flow meter comprising a flow tube having fluid flow input and fluid flow output means and a peripheral wall defining a generally circular flow cross section, a pair of generally semicircular movable vanes pivotally mounted within the flow tube on a common fixed diametral axis thereof for pivotal movement towards the axial plane containing said axis and downstream of said axis, biasing means coupled to said vanes for urging the latter against the fluid flow and in a direction so as to close the said tube and fluid flow indicating means. Preferably the fluid flow indicating means will comprise a pair of pressure taps arranged respectively upstream and downstream of the vanes, said taps being connected to a device capable of measuring differential pressure. Alternatively, the fluid flow indicating means may take the form of a mechanical linkage coupled to the said vanes.

DESCRIPTION OF EMBODIMENT

Figure 1:
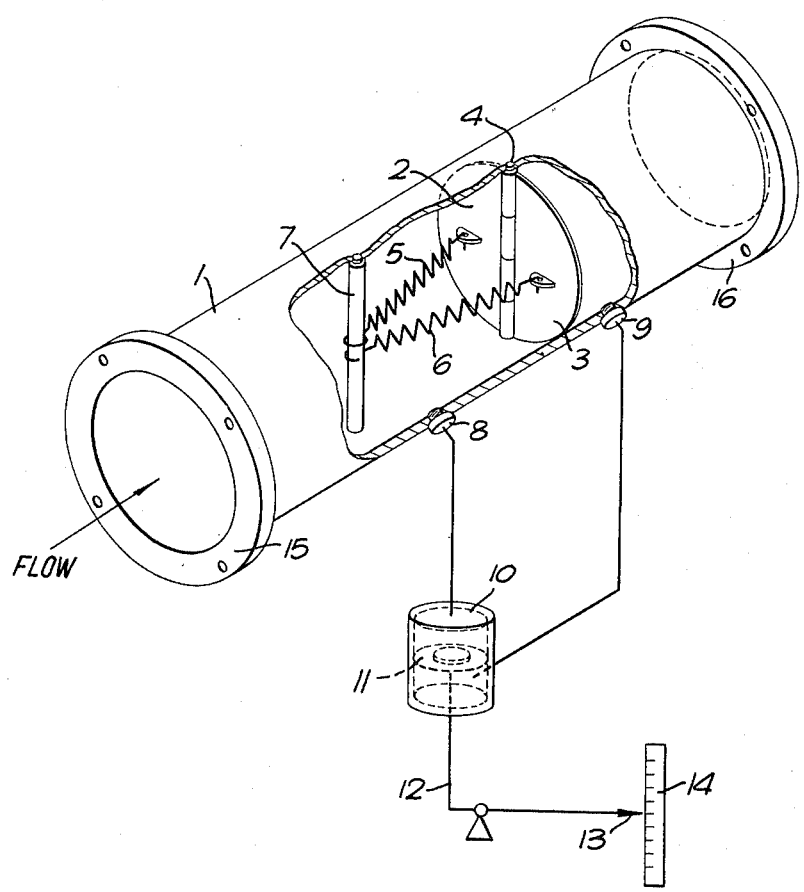
FIG. 1 is a view partly in section of the flow tube and indicator.

In the flow tube 1 a pair of semicircular vanes 2, 3 are hinged for rotation about a diametral pivor 4. The vanes 2, 3 are urged into a position in which they close the tube by springs 5, 6 attached at their first ends to their respective vanes and at their second ends to a support 7. Pressure taps 8, 9 coupled to a diaphragm chamber 10 are mounted respectively upstream and downstream of the said vanes. the diaphragm chamber 10 contains a diaphragm 11 which is connected through a linkage 12 to an indicator 13 to co-operate with a scale 14 which indicates in flow units. Mounting flanges 15, 16 are provided at each end of the flow tube 1.

Figure 2:
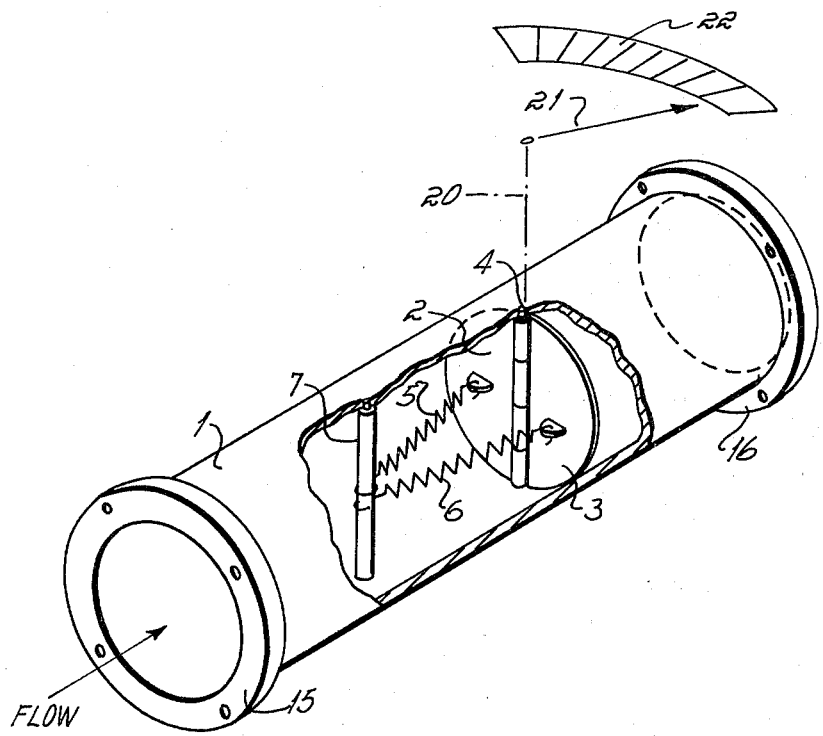
FIG. 2 is a view partly in section of the flow tube with a different form of indicator.

In an alternative arrangement the vanes are coupled directly to a mechanism for indicating the angular displacement of the vanes and thereby providing a measure of the fluid flow: see FIG. 2. This alternative arrangement includes mechanical linkage 20 coaxially fixed to one of the vanes at one end, and connected to an indicator 21 at the other end. The indicator 21 cooperates with scale 22 which also indicates in flow units.

The fluid flow meter described herein may provide a direct indication of flow, relative to the pressure differential measured upstream and downstream of the vanes, over a measuring range of 100 to 1.

It will be appreciated by skilled workers in the art that alternative pressure differential measuring devices may be substituted for the arrangement shown herein, and that known linearizing or characterizing linkages may be provided on the output of the diaphragm chamber. It will also be appreciated by those skilled in the art that the measuring device described herein may also be employed for measuring liquid flows where a low pressure loss is an advantage.

I claim:

1. A fluid flow meter comprising
   a flow tube having fluid flow input and fluid flow output means, said tube having a peripheral wall defining a generally circular flow cross section;
   a pair of generally semicircular movable vanes pivotally mounted within the flow tube about a common fixed diametral axis of said tube for pivotal movement towards the axial plane containing said common axis and downstream of said axis;
   biasing means coupled to said vanes for urging the latter to pivot against the fluid flow and in a direction so as to close the said tube, and
   fluid flow indicating means connected to said flow meter, said fluid flow indicating means serving to indicate the fluid flow through said flow tube.

2. A fluid flow meter according to claim 1 wherein said fluid flow indicating means comprises pressure tapping means disposed upstream and downstream of the said vanes, said pressure tapping means being adapted for coupling to a pressure differential indicating means.

3. A fluid flow meter comprising:
   a fluid flow tube having first and second axial ends, said first end including fluid flow input means and said second end including fluid flow output means, said tube having a peripheral wall between said ends defining a generally circular flow cross section;
   a first support means within said tube and between said ends, said support means being arranged along a diametral axis of the tube thereby dividing the said flow passage;
   a pair of generally semicircular movable vanes hinged on said first support so as to pivot about the said diametral axis and downstream of said axis;
   second support means mounted within the flow tube upstream of the said first support means;
   respective spring means coupling each said vane to the said second support means so as to urge said vanes in a direction to close the tube;
   first pressure tapping means provided upstream of said vanes; and
   second pressure tapping means provided downstream of said vanes.

4. A fluid flow meter comprising:
   a flow tube having a fluid flow input and a fluid flow output means, said tube having a peripheral wall defining a generally circular flow cross section;
   a pair of generally semicircular movable vanes pivotally mounted within the flow tube about a common fixed diametral axis of said tube for pivotal movement towards the axial plane containing said common axis and downstream of said axis;
   biasing means coupled to said vanes for urging the latter to pivot against the fluid flow and in a direction so as to close the said tube, and mechanical means coupled to at least one of said vanes for indicating angular displacement of said vanes relative to their closed position.

5. A fluid flow meter comprising:

a fluid flow tube having first and second axial ends, said first end including fluid flow input means and said second end including fluid flow output means, said tube having a peripheral wall between said ends defining a generally circular flow cross section;

a first support means within said tube and between said ends, said support means being arranged along a diametral axis of the tube thereby dividing the said flow passage;

a pair of generally semicircular movable vanes hinged on said first support so as to pivot about the said diametral axis and downstream of said axis;

second support means mounted within the flow tube upstream of the said first support means;

respective spring means coupling each said vane to the said second support means so as to urge said vanes in a direction to close the tube; and mechanical means coupled to at least one of said vanes for indicating angular displacement of said vanes relative to their closed position.

* * * * *